Dec. 4, 1951 — L. E. UNDERWOOD — 2,577,290
COLLAPSIBLE GOLF BAG CARRIER
Filed June 28, 1950 — 2 SHEETS—SHEET 1

INVENTOR.
Lowell E. Underwood
BY
Att'y

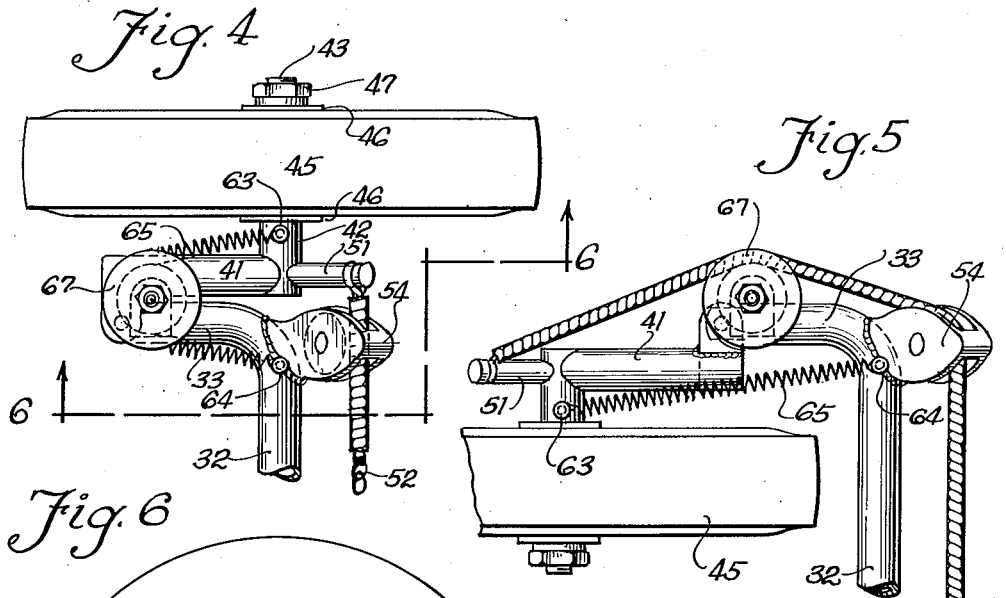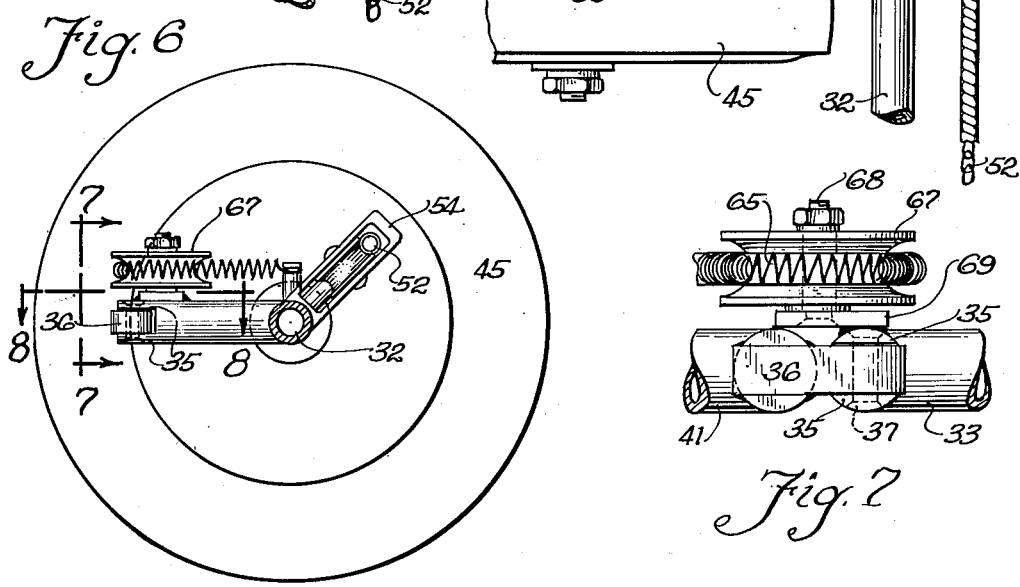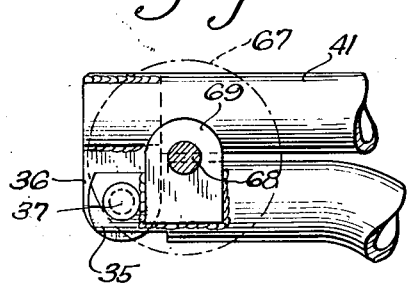

Patented Dec. 4, 1951

2,577,290

UNITED STATES PATENT OFFICE 2,577,290

COLLAPSIBLE GOLF BAG CARRIER

Lowell E. Underwood, Chicago, Ill.

Application June 28, 1950, Serial No. 170,739

7 Claims. (Cl. 280—42)

This invention relates to a collapsible cart for transporting a golf bag and its contents.

Carts of this general character are well known and have been disclosed in various forms. However many of these are cumbersome, both when set up and collapsed, some are complicated to a degree which renders the same unwieldy in manipulation in addition to substantially increasing the cost; while others have been so simplified to lower the cost as to defeat the purpose for which they are intended. In some instances the means for operating the mechanism is difficult of access, and is so arranged that, if due care is not exercised, fingers are likely to be injured.

My invention has for a principal object the provision of a cart arranged to receive securely a golf bag for transportation over the course, but which may be collapsed for storage in the rear of an automobile or the luggage compartment thereof, or in any other location where space is at a premium.

Another object is to provide a collapsible cart as aforesaid from which the bag need not be disunited when the cart is collapsed.

Still another object is to provide a collapsible cart as aforesaid in which the wheels are moved to and automatically locked in extended position during a single movement of the actuating member.

Another object rests in providing a handle serving the dual purpose of manipulating the wheels to extended position and for wheeling the cart about.

Other objects will become apparent as the description proceeds.

In the drawings, which show one way in which the invention may be embodied in practice:

Fig. 4 is a somewhat enlarged detail in plan showing one of the wheels and its pivoting means in extended position;

Fig. 5 is a view similar to that of Fig. 4, but with the wheel in retracted position;

Fig. 6 is a cross section taken on the line 6—6 of Fig. 4;

Fig. 7 is a cross section, slightly enlarged, taken on the line 7—7 of Fig. 6; and Fig. 8 shows a cross section taken on the line 8—8 of Fig. 6.

Figure 1:
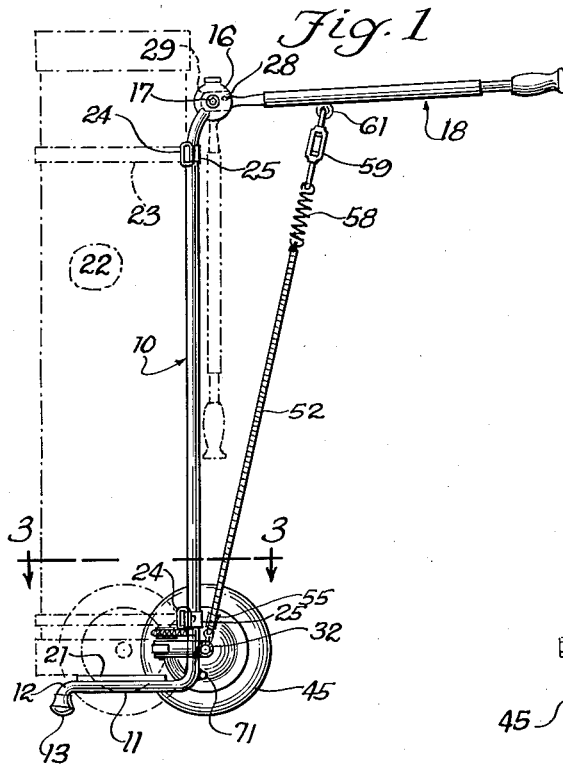
Fig. 1 is a left side elevational view of the cart of my invention.
Figure 2:
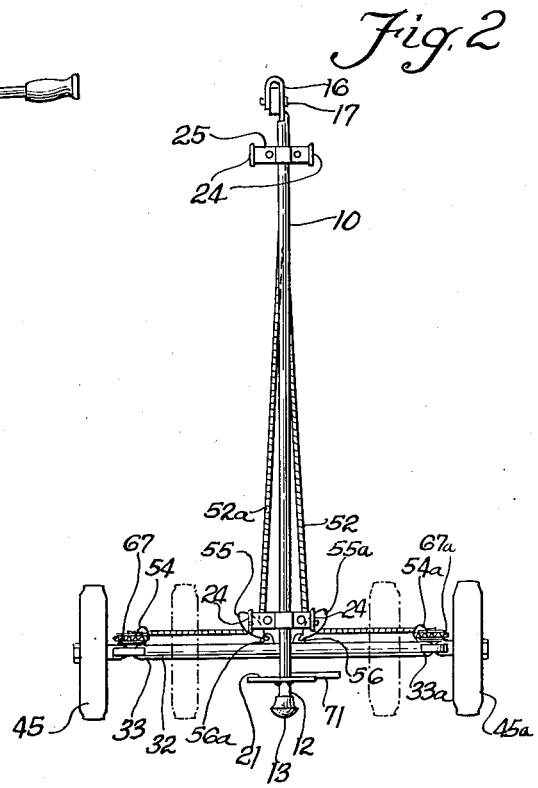
Fig. 2 is a front view thereof.
Figure 3:
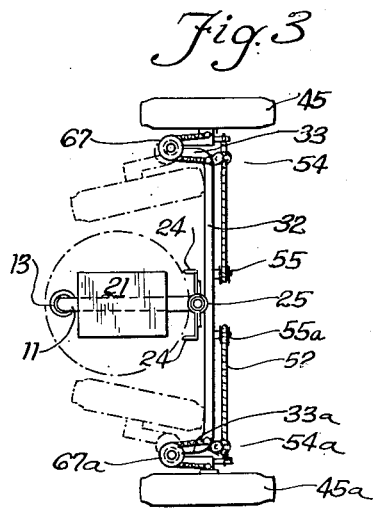
Fig. 3 shows a cross section taken along the line 3—3 of Fig. 1.

Referring to Figs. 1 to 3, the cart comprises a principal member 10 preferably of light weight tubing, extending vertically over its principal extent and bent forwardly and then downwardly at its lower end to form an extension 11 and foot 12, this latter being equipped with a rubber shoe 13 to protect the surface upon which the cart may rest, e. g. the putting greens. At its upper extremity the member 10 is provided with a yoke 16 within which a handle 18 to be described is pivoted at 17.

Extension 11 carries a pad or platform 21 upon which the bottom of the bag 22 may rest. Straps 23 sustained by eyes 24 in brackets 25—25, in turn secured to the member 10, embrace the bag for retention thereof laterally.

The cart is propelled by the handle 18 of elongated form for convenience in steering, the same being lockable in active and inactive (dotted line) positions as shown. Any suitable catch or detent means may be utilized for maintaining the active position, e. g. a hinged catch 28 mounted on the yoke engaging a notch on the end 29 of the handle. Tension for the latching means is furnished by the wheel actuating means now to be detailed.

Turning now to all of the figures the member 10 has secured thereto a transverse support 32 also preferably of light weight tubing bent forwardly at its extremities to form arms 33 and 33a. Each arm (Figs. 6 to 8) terminates in a pair of spaced ears 35 between them receiving a pivoted lug 36, the pivot pin being indicated at 37. Such pivoted or hinged arrangement will sometimes be referred to herein as a "knuckle joint."

Each lug 36 is integral with a strut 41 to which is secured at right angles a housing 42 carrying the stub shaft 43. Shaft 43 carries a freely rotatable and preferably rubber-tired wheel 45, there being the usual retaining washers 46—46 and nut 47.

From the foregoing it will have become apparent that the wheel and wheel mounting may be rotated (Fig. 3) about the pivot 37 from extended or operative position (full lines) to retracted or inoperative position (dotted lines). Figs. 4 and 5 also show these two extreme positions.

For operating the wheels in the manner just indicated a cable-like member, e. g. a chain arrangement is employed. Protruding from each housing 42 is a stud 51, to each of which one end of chains 52—52 are connected, only one such chain being shown in Figs. 4 to 6. In the extended and retracted position of the wheels, the chains 52—52 are adapted to pass over respective sheaves 54 and 54a rigidly mounted on the support 32, and thence over sheaves 55 and 55a swingably carried on eyes 56 and 56a integral with support 32 in order that movement of the chain transversely under manipulation of the handle 18 may be properly accommodated.

Chains 52 and 52a continue upwardly to one end of a common tension spring 58, the other end of which is secured to one end of suitable additional slack-accommodating means, e. g. a turnbuckle 59, the opposite end of the latter being received by an eye 61 secured to handle 18. For reducing the friction of the chains 52 and 52a over their respective sheaves and for esthetic considerations, the same may be sheathed by spirally wound or tubular plastic or like material of common construction and as shown.

Extending between spring posts 63 and 64, secured to the housing 42 and support 32 respectively, is a tension spring 65 adapted in certain positions thereof to be guided around a grooved wheel 67 freely rotatable on a post 68 carried on a bracket 69 of the support arms 33 and 33a. When the wheels 45 and 45a are extended the spring 65 is stretched around the wheel 67 (Fig. 4) and when the wheels are retracted the spring contracts in a straight configuration (Fig. 5). It will be clear that the wheels will be automatically retracted under such spring tension upon release of tension in the chains.

In the case of the chains 52 and 52a, these, when the wheels are extended, are positioned as seen in Fig. 4, and, when the wheels are retracted, pass from the sheaves 54 and 54a over the wheels 67 and 67a. The construction and arrangement of the parts is such that the wheels 67 and 67a serve to guide either the springs 65 and 65a, or the chains 52 and 52a, one at a time without interference. Stated otherwise, as the chains are drawn upwardly by the handle 18 the chain 52, for example, will leave the wheel 67 just before the spring 65 moves into contact therewith.

From the foregoing it will have become clear that in collapsed condition the cart is substantially narrower transversely than when set up (Fig. 3), as well as fore and aft (Fig. 1). Setting up of the cart is accomplished by a single motion, namely the simple lifting of the handle 18 to horizontal position whereat it is automatically locked by latch 28 dropping into its slot. To collapse the cart the latch 28 is tripped whereupon the springs 65 and 65a are free to retract the wheels, and as clearly seen in Figs. 4 and 5. To steady the cart during activation of the handle 18 there may be provided a projecting member 71 upon which one's foot may be pressed.

While I have shown a particular embodiment of my invention, it will be understood, of course, that I do not wish to be limited thereto since many modifications may be made, and I therefore contemplate by the appended claims to cover any such modifications as fall within the true spirit and scope of my invention.

Having thus described my invention, what I claim and desire to secure by Letters Patent is:

1. A collapsible golf bag cart comprising a frame, means for supporting the bag on said frame, a handle for propelling the cart pivotally mounted on said frame, a pair of wheel supports, one disposed at each side of said frame, a wheel rotatably carried on each said support, a knuckle joint interconnecting each said support to said frame for swinging movement of said supports over an angle of substantially 180° from an extended position exteriorly of the maximum widthwise dimension of said frame to a retracted position interiorly of said dimension, a pair of linkages interconnecting each said support to said handle for joint actuation of said wheels about said knuckle joints from a retracted to an extended position and vice versa upon movement of said handle, and means for biasing said wheel supports to retracted position.

2. A cart as recited in claim 1 in which each said linkage comprises a cable-like member and guide sheaves for said member supported on said frame.

3. A cart as recited in claim 2 in which said member comprises chain.

4. A collapsible golf bag cart comprising a frame, means for supporting the bag on said frame, a handle for propelling the cart pivotally mounted on said frame, a pair of wheel supports one disposed at each side of said frame, a wheel rotatably carried on each said support, said frame including a transversely extending member terminating at its ends in forwardly directed arms, a pivotal connection between each said arm and a wheel support, a linkage interconnecting said supports and said handle for rotating said supports about said pivotal connection in one sense, and biasing means intermediate each said arm and its associated support for rotating said supports in the opposite sense, and means for locking said handle against the urging of said biasing means.

5. A cart as recited in claim 4 in which said linkage comprises a flexible elongated member and guide sheaves for said member mounted on said frame.

6. A collapsible golf bag cart comprising a principal vertically disposed frame member, a transverse frame member secured thereto and terminating at each end in forwardly directed arms, an elongated handle for propelling the cart hingedly connected by one end adjacent the upper end of said vertical frame member and operable to active and inactive positions, means for releasably locking said handle in active position, a pair of supports one individual to each said arm and pivotally connected thereto, a wheel rotatably mounted on each said support, tension means interconnecting each said support and its associated arm for biasing each wheel to a retracted position, a cable-like member interconnecting each said support to said handle, means carried on said frame members for guiding said cable-like member whereby movement of said handle to active position is effective, through said cable-like member to actuate said wheels to said extended position against the bias of said tension means.

7. A collapsible golf bag cart comprising a frame, means for supporting the bag on said frame, a handle for propelling the cart movably interconnected to said frame, a pair of wheel supports each pivotally mounted at laterally opposite sides of said frame, each support having a wheel rotatably mounted thereon, a linkage interconnecting said supports and handle for pivoting said supports over an arc of substantially 180° to move said supports and wheels from a retracted to an extended position, bias means intermediate said frame and supports for urging said supports and wheels from extended to retracted position, and means for locking said handle against the urging of said bias means.

LOWELL E. UNDERWOOD.

REFERENCES CITED

The following references are of record in the file of this patent:

FOREIGN PATENTS

| Number | Country | Date |
| --- | --- | --- |
| 626,560 | Great Britain | July 18, 1949 |